United States Patent
Dellock et al.

(10) Patent No.: US 10,118,593 B2
(45) Date of Patent: Nov. 6, 2018

(54) POLICE VEHICLE MONITOR

(71) Applicant: Ford Global Technologies, LLC, Dearborn, MI (US)

(72) Inventors: Paul Kenneth Dellock, Northville, MI (US); Pietro Buttolo, Dearborn Heights, MI (US); Stuart C. Salter, White Lake, MI (US); Doug H. Randlett, Metamora, MI (US); Christopher Charles Hunt, Livonia, MI (US); Matthew C. Mullen, New Hudson, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/184,381

(22) Filed: Jun. 16, 2016

(65) Prior Publication Data
US 2017/0361807 A1 Dec. 21, 2017

(51) Int. Cl.
| | |
|---|---|
| *B60R 25/24* | (2013.01) |
| *B60R 25/01* | (2013.01) |
| *B60R 25/06* | (2006.01) |
| *B60R 25/08* | (2006.01) |
| *B60R 25/10* | (2013.01) |

(52) U.S. Cl.
CPC .......... *B60R 25/24* (2013.01); *B60R 25/016* (2013.01); *B60R 25/06* (2013.01); *B60R 25/08* (2013.01); *B60R 25/1012* (2013.01)

(58) Field of Classification Search
CPC ....... B60R 25/016; B60R 25/06; B60R 25/08; B60R 25/1012; B60R 16/02; F02D 41/042; F02D 41/062; B60K 28/04; B60W 30/06; F02N 11/0818; F02N 2200/0803; F02N 2200/0815; F02N 2200/106; Y02T 10/48
USPC .......... 701/45, 49; 340/426.27, 426.28, 540, 340/542, 545.1, 545.7, 545.8
See application file for complete search history.

(56) References Cited

U.S. PATENT DOCUMENTS

| | | | |
|---|---|---|---|
| 6,542,071 B1 | 4/2003 | Ohtsubo et al. | |
| 7,844,377 B2 * | 11/2010 | Oota ................... | B60R 25/2009 340/425.5 |
| 8,224,313 B2 | 7/2012 | Howarter et al. | |
| 9,024,749 B2 | 5/2015 | Ratajczyk | |
| 9,045,102 B2 | 6/2015 | Caratto et al. | |
| 9,047,749 B2 | 6/2015 | Kane et al. | |

(Continued)

FOREIGN PATENT DOCUMENTS

WO    WO 2014191537 A1    12/2014

OTHER PUBLICATIONS

Search Report dated Dec. 14, 2017, for GB Patent Application No. GB1709398.0 (8 Pages).

*Primary Examiner* — Nga X Nguyen
(74) *Attorney, Agent, or Firm* — James P. Muraff; Neal, Gerber & Eisenberg LLP

(57) ABSTRACT

Systems and methods are disclosed for a police vehicle monitor. An example disclosed police vehicle includes first beacons positioned on a chassis of the police vehicle, second beacons position on a lightbar of the police vehicle, and a police assistance unit. The example police assistance unit is to track a distance of wearable nodes associated with a police officer. Additionally, the example police assistance unit is to, in response to the distance satisfying a first threshold, lock doors and roll up windows of the police vehicle.

15 Claims, 4 Drawing Sheets

(56) References Cited

U.S. PATENT DOCUMENTS

| | | |
|---|---|---|
| 9,253,452 B2 | 2/2016 | Ross et al. |
| 2003/0095688 A1* | 5/2003 | Kirmuss ................ B60R 11/02 |
| | | 382/105 |
| 2005/0099263 A1 | 5/2005 | Ikeda |
| 2007/0195939 A1 | 8/2007 | Sink et al. |
| 2007/0242472 A1 | 10/2007 | Gergets et al. |
| 2009/0207252 A1 | 8/2009 | Raghunath |
| 2010/0075656 A1 | 3/2010 | Howarter et al. |
| 2013/0246135 A1* | 9/2013 | Wang .................... G07C 5/008 |
| | | 705/14.4 |
| 2014/0240091 A1 | 8/2014 | Talty et al. |

* cited by examiner

POLICE VEHICLE MONITOR

TECHNICAL FIELD

The present disclosure generally relates to police vehicles and, more specifically, a police vehicle monitor.

BACKGROUND

Police officers often exit their vehicles in a hurry in circumstances that can change dynamically from moment-to-moment. As such, police officers do not always have time to secure the police vehicle when, for example, the police officer initiates a chase on foot of a suspect.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for a police vehicle monitor. An example disclosed police vehicle includes first beacons positioned on a chassis of the police vehicle, second beacons position on a lightbar of the police vehicle, and a police assistance unit. The example police assistance unit is to track a distance of wearable nodes associated with a police officer. Additionally, the example police assistance unit is to, in response to the distance satisfying a first threshold, lock doors and roll up windows of the police vehicle.

An example disclosed method includes receiving signal strength values from wearable nodes associated with a police officer from at least one of first beacons positioned on a chassis of the police vehicle or second beacons position on a lightbar of the police vehicle. The example disclosed method also includes tracking a distance of the wearable nodes. Additionally, the example method includes, in response to the distance satisfying a first threshold, locking doors and rolling up windows of the police vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
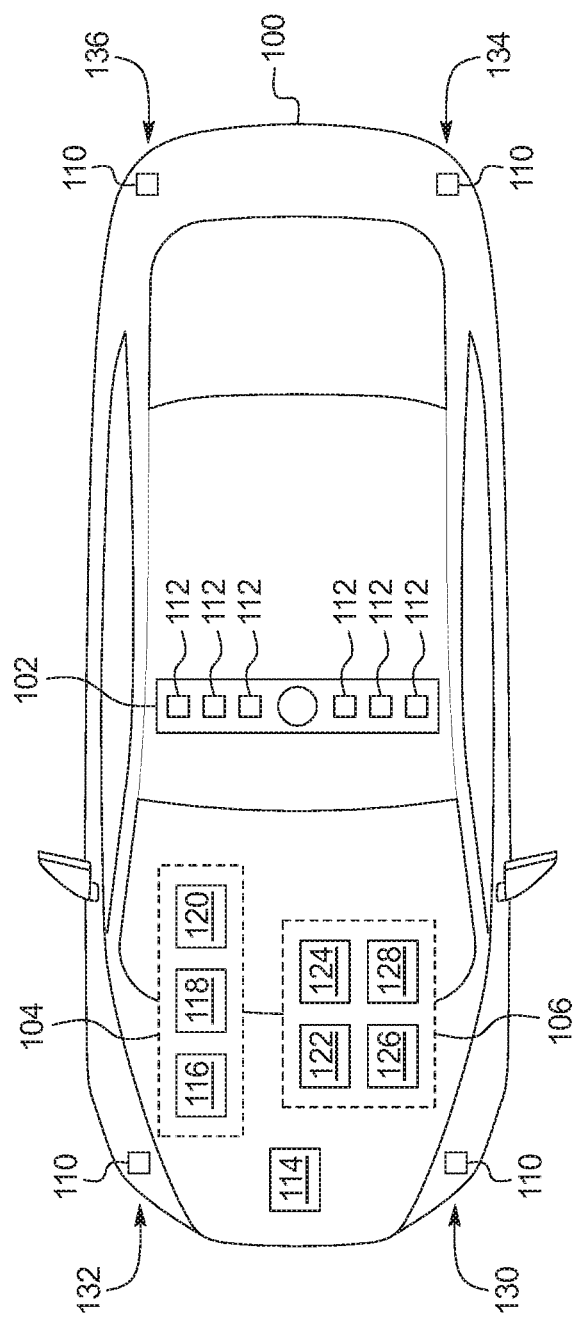
FIGS. 1A and 1B illustrate a police vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

A police assistance unit monitors the location of one or more police officers. The police vehicle includes wireless nodes installed on the chassis and the light bar. The wireless nodes include direction antenna to create overlapping detection zones around the police vehicle. The police officer(s) wear wireless nodes (e.g., on a belt, on a vest, etc.). The police assistance unit determines the location of the police officers based on received signal strength indications (RSSI) and/or received transmission strengths (RX) between the wireless nodes of the police vehicle and the wireless nodes worn by the officers. The location of the officer(s) is/are estimated via trilateration. As used herein, the terms "trilaterate" and "trilateration" are defined as the process of determining locations of points (e.g., the wireless nodes, etc.) by measurement of distances, using the geometry of circles, spheres or triangles. The police assistance unit (a) determines a distance between the police vehicle and the police officer, (b) determines a trajectory of the police officer, and/or (c) determines if the police officer is inside or outside the police vehicle.

The police assistance unit is communicatively coupled with sensors (e.g., cameras, infrared sensors, range detection sensors, cabin temperature sensors, engine temperature sensors, etc.) internal and external to the vehicle. Additionally, the police assistance unit is communicatively couple to various electronic control units (ECUs) that control subsystems of the police vehicle. Based on the sensors and the location and/or trajectory of the police officer, the police assistance unit instructs the ECUs to take actions to secure the police vehicle, activate an alarm, and/or send a notification to the office officer(s). For example, if the police assistance unit determines that the police officer is greater than fifteen feet from the police vehicle, the police assistance unit may instruct the body control unit to roll up the windows and lock the doors.

Figure 1B:
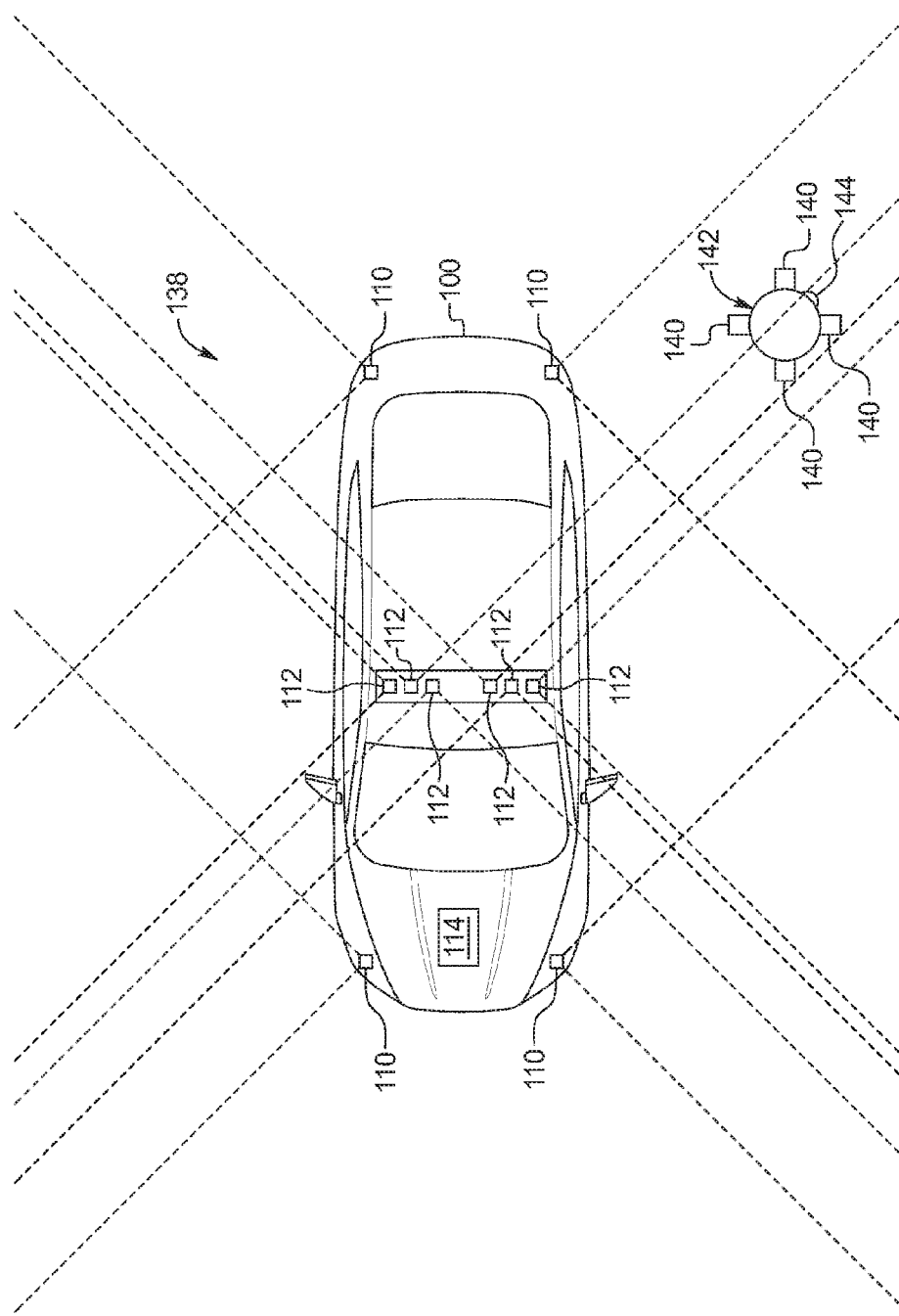

FIGS. 1A and 1B illustrate a police vehicle 100 operating in accordance with the teachings of this disclosure. The police vehicle 100 may be any suitable type of vehicle (e.g., a car, a truck, a van, a tactical vehicle, etc.). The police vehicle 100 may be a standard gasoline powered vehicle, a hybrid vehicle, an electric vehicle, a fuel cell vehicle, and/or any other mobility implement type of vehicle. The police vehicle 100 includes parts related to mobility, such as a powertrain with an engine, a transmission, a suspension, a driveshaft, and/or wheels, etc. The police vehicle 100 may be non-autonomous or semi-autonomous. In the illustrated example, the police vehicle 100 includes a light bar 102, electronic control units (ECUs) 104, sensors 106, a light dome 108, chassis wireless nodes 110, light bar wireless nodes 112, and a police assistance unit 114.

In the illustrated example, the light bar 102 includes rotational lights in different colors, such as red and blue, fixed-beam lights, LED-based lights, and/or a siren, etc. The light bar 102 may be straight or a "V" shape. The light bar 102 includes the light bar wireless nodes 112 (sometimes referred to as "light bar beacons"). In some examples, the lights in different colors, such as red and blue, fixed-beam lights, LED-based lights, and/or a siren are housed in an interior light bar at the front edge of the interior of the roof of the police vehicle 100. In such examples, the light bar 102 includes a low profile housing for the light bar beacons 112.

The ECUs 104 monitor and control the subsystems of the police vehicle 100. The ECUs 104 communicate and exchange information via a vehicle data bus (e.g., the vehicle data bus 202 of FIG. 2 below). Additionally, the ECUs 104 may communicate properties (such as, status of the ECU 104, sensor readings, control state, error and diagnostic codes, etc.) to and/or receive requests from other ECUs 104. Some police vehicles 100 may have seventy or more ECUs 104 located in various locations around the police vehicle 100 communicatively coupled by the vehicle data bus. The ECUs 104 are discrete sets of electronics that include their own circuit(s) (such as integrated circuits, microprocessors, memory, storage, etc.) and firmware, sensors, actuators, and/or mounting hardware. In the illustrated example, the ECUs 104 include a body control unit 116, a transmission control unit 118, and a brake control unit 120.

The body control unit 116 controls various subsystems of the police vehicle 100. For example, the body control unit 116 may control power windows, power locks, an immobilizer system, and/or power mirrors, etc. The body control unit 116 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. The transmission control unit 118 controls, based on input from sensors the 106 (e.g., vehicle speed sensors, throttle position sensor, etc.) and/or other ECUs 104, the transmission of the police vehicle 100. The transmission control unit 118 determines when to change the gears of the transmission. The brake control unit 120 controls the operation of the brakes of the police vehicle 100 in response to, for example, the brake pedal. The brake control unit 120 may include an anti-lock brake system, electronic stability control, and/or traction control, etc.

The sensors 106 may be arranged in and around the police vehicle 100 in any suitable fashion. The sensors 106 may include camera(s), sonar, RADAR, LiDAR, ultrasonic sensors, optical sensors, or infrared devices configured to measure properties around the exterior of the police vehicle 100. Additionally, some sensors 106 may be mounted inside the cabin of the police vehicle 100 or in the body of the police vehicle 100 (such as, the engine compartment, the wheel wells, etc.) to measure properties in the interior of the police vehicle 100. For example, such sensors 106 may include accelerometers, odometers, tachometers, pitch and yaw sensors, wheel speed sensors, microphones, tire pressure sensors, and biometric sensors, etc. In the illustrated example, the sensors 106 include one or more cabin detection sensors 122 (e.g., cameras, weight sensors, heart rate sensors, etc.), a cabin temperature sensor 124, and an engine temperature sensor 126. In some examples, the sensors 106 include range detection sensors 128.

The cabin detection sensor(s) 122 detect the presence of the people (e.g., police officers, detained individuals, etc.) and, in some examples, animals (e.g., K-9 units) inside the police vehicle 100. The cabin detection sensor(s) 122 differentiate the presence of people or animals in font seats of the police vehicle 100 from the presence of people or animals in rear seats of the police vehicle 100. For example, when the police officer(s) is/are not in the police vehicle 100, movement in the front seat(s) may indicate unauthorized access to a portion of the police vehicle 100. The cabin temperature sensor 124 measures the temperature inside the cabin of the police vehicle 100. The engine temperature sensor 126 measures the temperature of the engine or a system thermally coupled to the engine of the police vehicle 100. For example, the engine temperature sensor 126 may measure the temperature of engine coolant to determine the temperature of the engine. The range detection sensors 128 may include ultrasonic sensors, RADAR, and/or LiDAR, etc. The range detection sensors 128 detect objects (e.g., vehicles, people, etc.) approaching the police vehicle 100.

The light dome 108 includes infrared light emitting diodes (LEDs) and a proximity detection sensor. The proximity detection sensor of the light dome 108 measures infrared light emitted from the LEDS reflected off of objects (e.g., vehicles, people, etc.) to detect when the object is approaching the police vehicle. In the illustrated example, the light dome is positioned on the light bar 102. Alternatively, in some examples, the light dome 108 is positioned on the roof of the police vehicle 100. In some examples, the light dome 108 detects objects in conjunction with the range detection sensors 128. In some such examples, the light dome 108, in response to detecting an object within proximity of the police vehicle 100, activates the range detection sensor(s) 128 to track the trajectory of the object approaching the police vehicle 100.

The chassis wireless nodes 110 (sometimes referred to as "chassis beacons") are positioned on the chassis of the police vehicle 100. In the illustrated example, the chassis beacons 110 are positioned on a front driver-side corner 130, a front passenger-side corner 132, a rear driver-side corner 134, and a rear passenger-side corner 136. The chassis beacons 110 and the light bar beacons 112 include hardware and firmware to implement a short-range wireless network, such as Bluetooth Low Energy (BLE). The BLE protocol is set forth in Volume 6 of the Bluetooth Specification 4.0 (and subsequent revisions) maintained by the Bluetooth Special Interest Group. In some examples, the beacons 110 and 112 include multidirectional antenna. Alternatively or additionally, in some examples, the beacons 110 and 112 include directional antennas.

As illustrated in FIG. 1B, the beacons 110 and 112 create a detection zone 138 around police vehicle 100. The size of the detection zone 138 is determined by the ranges of the beacons 110 and 112. For example, the range for BLE-based beacons 110 and 112 with multi-directional antenna may be 10 meters (33 feet) and the range for BLE-based beacons 110 and 112 with directional antenna may be 50 meters (164 feet). Police officers wear one or more wearable wireless nodes 140 on an item of clothing 142 (e.g., a belt, a vest, etc.). In some examples, the wearable wireless nodes 140 include an identifier (e.g., an alphanumeric value) that identifies a particular police officer associated with the item of clothing 142. The item of clothing 142 also includes a notification system 144 (e.g., an alarm, a buzzer, a speaker, etc.) to provide an audible and/or haptic warning to the police officer.

Messages exchanged between the wearable wireless nodes 140 and the beacons 110 and 112 include the RSSI and/or the RX between wearable wireless nodes 140 and the beacons 110 and 112. The RSSI and RX values measure the open-path signal strength that the one of the wearable wireless nodes 140 detects from the corresponding beacon 110 and 112. The RSSI is measured in signal strength percentage, the values (e.g., 0-100, 0-137, etc.) of which are defined by a manufacturer of hardware used to implement the beacons 110 and 112. Generally, a higher RSSI means that the wearable wireless node 140 is closer to the corresponding beacon 110 and 112. The RX values are measured in Decibel-milliWatts (dBm). For example, when the wearable wireless nodes 140 are one meter (3.28 feet) away, the RX value may be −60 dBm, and when the wearable wireless nodes 140 are two meters (6.56 feet) away, the RX value may be −66 dBm. The RSSI/RX values are used to determine the distance from the wearable wireless nodes 140 to the particular beacon 110 and 112. In the illustrated example, the beacons 110 and 112 determines up to four distance measurements corresponding to the four wearable wireless nodes 140. In some examples, when the two or more beacons 110 detect the wearable wireless nodes 140, the location of the corresponding police officer relative the police vehicle 100 may be determined.

The police assistance unit 114 tracks the location of the police officer(s) and reacts to events based on the location of the police officer(s). The police assistance unit 114 is communicatively coupled to the ECUs 104, the sensors 106, the light dome 108, and the beacons 110 and 112. The police assistance unit 114 receives the RSSI/RX measurements from the beacons 110 and 112. Based on (a) the beacon(s) 110 and 112 that detected the wearable wireless nodes 140 and (b) the RSSI/RX measurements associated with the wearable wireless nodes 140, the police assistance unit 114 determines (i) the distances of the corresponding police officer(s) from the police vehicle 100, (ii) the location of the police officer(s) relative to the police vehicle 100, and/or (iii) the trajectory of the police officer(s) relative to the police vehicle 100. Additionally, the police assistance unit 114 determines whether the police officer(s) is/are inside the police vehicle 100 (e.g., via the cabin detection sensors 122, via the RSSI/RX measurements from the beacons 110 and 112, etc.).

In a first example scenario, the police assistance unit 114 tracks the location of the police officer associated with the item of clothing 142. If the distance between the police officer (e.g., the item of clothing 142) and the police vehicle 100 satisfies (e.g., is greater than) a departure distance threshold, the police assistance unit 114 instructs the body control unit 116 to lock the doors and roll up the windows of the police vehicle 100. In some examples, the departure distance threshold is 25 feet. If the distance between the police officer (e.g., the item of clothing 142) and the police vehicle 100 satisfies (e.g., is less than) an approach distance threshold, the police assistance unit 114 instructs the body control unit 116 to unlock the front driver side door of the police vehicle 100. Alternatively, in some examples, based on the trajectory of the police officer (e.g., the item of clothing 142), police assistance unit 114 instructs the body control unit 116 to unlock the front door being approached by the police officer.

In a second example scenario, the police assistance unit 114 determines whether (a) the police officer (e.g., the item of clothing 142) is outside the police vehicle 100 and (b) the transmission of the police vehicle 100 is not in a park setting. If the police officer (e.g., the item of clothing 142) is outside the police vehicle 100 and the transmission of the police vehicle 100 is not in the park setting, the police assistance unit 114 instructs (i) the brake control unit 120 to apply the brakes and (ii) the transmission control unit 118 to, after the police vehicle 100 has stopped, shift the transmission of the police vehicle 100 into the park setting.

In a third example scenario, the police assistance unit 114 detects, via the light dome 108 and/or the range detection sensors 128, an object (e.g., a person, a vehicle, etc.) approaching with a detection radius of the police vehicle 100. In some examples, the detection radius is 20 feet. In response to detecting the object within the detection radius, the police assistance unit 114 determines whether the police officer (e.g., the item of clothing 142) is inside the police vehicle 100. If the police officer (e.g., the item of clothing 142) is inside the police vehicle, the police assistance unit 114 sounds a notification (e.g., an alarm, a buzzer, a horn, etc.) to alert the police officer. If the police officer (e.g., the item of clothing 142) is outside the police vehicle 100, the police assistance unit 114 instructs the notification system 144 of the item of clothing 142, via one of the beacons 110 and 112, to sound a notification to alert the police officer. For example, the police assistance unit 114 may instruct the notification system 144 to say, "Vehicle is being approached."

In an example fourth scenario, the police assistance unit 114 monitors the position of door (e.g., via the body control unit 116). In response to one of the doors being open, the police assistance unit 114 determines the location of the police officer (e.g., the item of clothing 142). If the distance between the police officer (e.g., the item of clothing 142) and the police vehicle 100 satisfies (e.g., is greater than) than a distance threshold, the police assistance unit 114 triggers an alarm (e.g., instructs the body control unit 116 to activate the horn of the police vehicle 100). If the distance between the police officer (e.g., the item of clothing 142) and the police vehicle 100 does not satisfy (e.g., is less than or equal to) than the distance threshold, the police assistance unit 114 instructs the notification system 144 of the item of clothing 142, via one of the beacons 110 and 112, to sound a notification to alert the police officer. For example, the police assistance unit 114 may instruct the notification system 144 to say, "A door is being opened." In some examples, the notification and/or the alarm may be different depending on whether a front door or a back door is being opened.

In an example fifth scenario, the police assistance unit 114 monitors the temperature (e.g., via the cabin temperature sensor 124) of the cabin of the police vehicle 100. If the temperature of the cabin of the police vehicle 100 satisfies (e.g., is greater than) a cabin temperature threshold, the police assistance unit 114 determines whether there is a person and/or an animal in the police vehicle 100. In some examples, the cabin temperature threshold is 100 degrees Fahrenheit (38 degrees Celsius). If there is a person and/or an animal in the police vehicle 100, the police assistance unit 114 instructs the notification system 144 of the item of clothing 142, via one of the beacons 110 and 112, to sound a notification to alert the police officer. For example, the police assistance unit 114 may instruct the notification system 144 to say, "Warning: elevated cabin temperature."

In an example sixth scenario, the police assistance unit 114 monitors the temperature (e.g., via the engine temperature sensor 126) of the engine of the police vehicle 100. If the temperature of the engine of the police vehicle 100 satisfies (e.g., is greater than) an engine temperature threshold, the police assistance unit 114 instructs the notification system 144 of the item of clothing 142, via one of the beacons 110 and 112, to sound a notification to alert the police officer. For example, the police assistance unit 114 may instruct the notification system 144 to say, "Warning: elevated engine temperature." In some examples, the engine temperature threshold is 235 degrees Fahrenheit (113 degrees Celsius).

In an example seventh scenario, the police assistance unit 114 monitors whether the police officer (e.g., the item of clothing 142) is inside or outside the police vehicle 100. If the police officer (e.g., the item of clothing 142) is outside the police vehicle 100, the police assistance unit 114 monitors the front portion of the interior of the cabin of the police vehicle 100. If the police assistance unit 114 detects movement in the front portion of the interior of the cabin, the police assistance unit 114 instructs the notification system 144 of the item of clothing 142, via one of the beacons 110 and 112, to sound a notification to alert the police officer. For example, the police assistance unit 114 may instruct the notification system 144 to say, "Warning: suspicious activity inside the vehicle."

Figure 2:
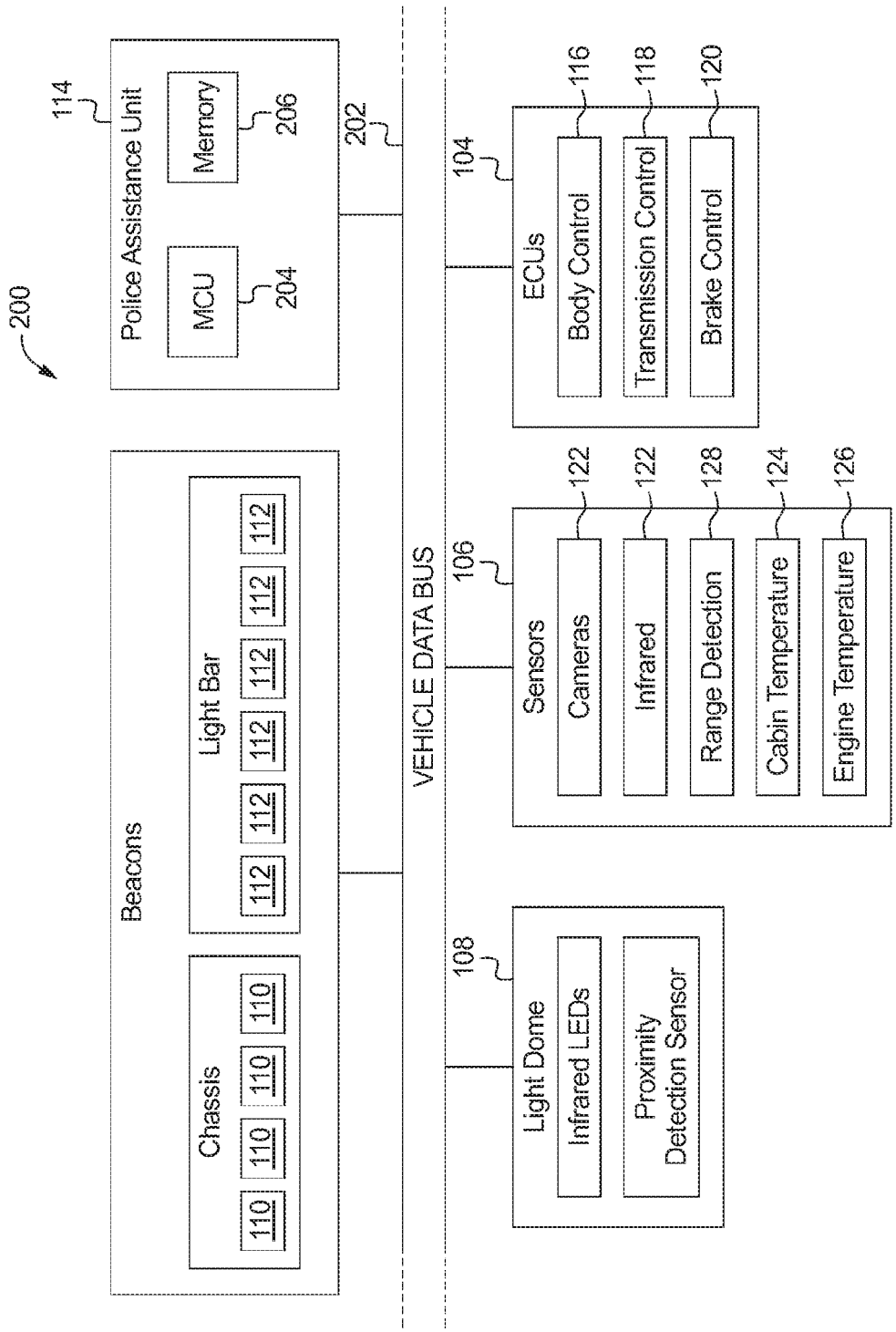
FIG. 2 is a block diagram of the electrical components of the police vehicle of FIGS. 1A and 1B.

FIG. 2 is a block diagram of the electrical components 200 of the police vehicle 100 of FIGS. 1A and 1B. In the illustrated example, the electrical components 200 include the police assistance unit 114, the beacons 110 and 112, the ECUs 104, the sensors 106, the light dome 108, and a vehicle data bus 202.

In the illustrated example, the police assistance unit 114 includes a processor or controller 204 and memory 206. The processor or controller 204 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 206 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and or high-capacity storage devices (e.g., a hard drive, a solid state drive, etc.). In some examples, the memory 206 includes multiple kinds of memory, particularly volatile memory and non-volatile memory.

The memory 206 is/are computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 206, the computer readable medium, and/or within the processor 204 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In the illustrated example, the vehicle data bus 202 includes one or more data buses wired throughout the police vehicle 100. The vehicle data bus 202 communicatively couples the ECUs 104, the sensors 106, the light dome 108, the beacons 110 and 112, and the police assistance unit 114. In some examples, the vehicle data bus 402 is implemented in accordance with the controller area network (CAN) bus protocol as defined by International Standards Organization (ISO) 11898-1. Alternatively or additionally, in some examples, the vehicle data bus 402 may include a Media Oriented Systems Transport (MOST) bus, or a CAN flexible data (CAN-FD) bus (ISO 11898-7).

Figure 3:
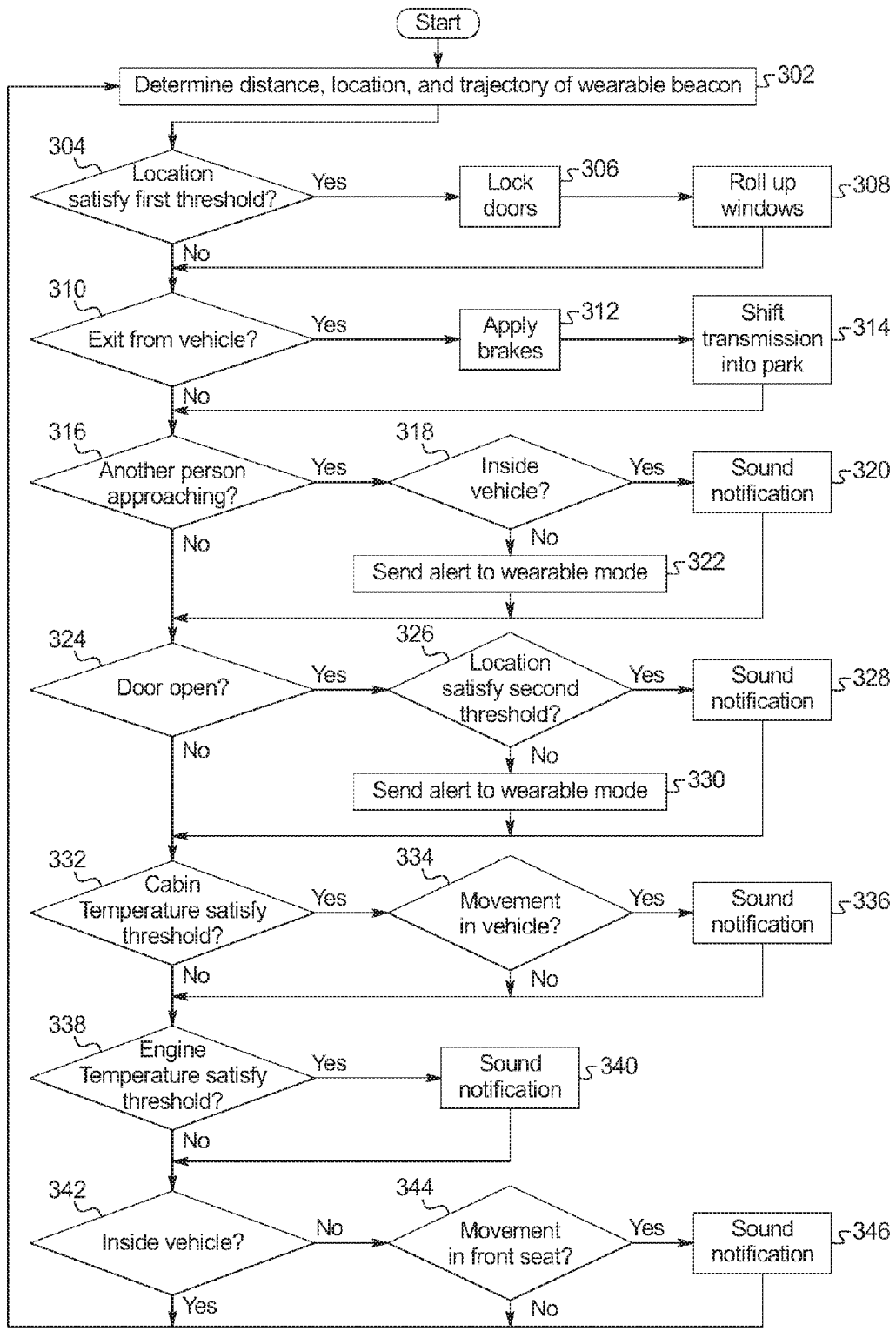
FIG. 3 is a flow diagram of a method to monitor the police vehicle of FIGS. 1A and 1B.

FIG. 3 is a flow diagram of a method to monitor the police vehicle 100 of FIGS. 1A and 1B. Initially, at block 302, the police assistance unit 114 determines the distance of a police officer (e.g., wearing the item of clothing 142) from the police vehicle 100, the location of the police officer (e.g., wearing the item of clothing 142) relative to the police vehicle 100, and/or the trajectory of the police officer (e.g., wearing the item of clothing 142) relative to the police vehicle 100. The police assistance unit 114 tracks the police officer (e.g., wearing the item of clothing 142) by triangulating the RSSI/RX between the beacons 110 and 112 of the police vehicle 100 and the wearable wireless nodes 140 of the item of clothing 142.

At block 304, the police assistance unit 114 determines whether the distance between the police officer (e.g., the item of clothing 142) and the police vehicle 100 satisfies (e.g., is greater than) the departure distance threshold. If the distance between the police officer (e.g., the item of clothing 142) and the police vehicle 100 satisfies the departure distance threshold, the method continues to block 306. Otherwise, if the distance between the police officer (e.g., the item of clothing 142) and the police vehicle 100 does not satisfy the departure distance threshold, the method continues to block 310. At block 306, the police assistance unit 114 instructs the body control unit 116 to lock the doors of the police vehicle 100. In some examples, if the distance between the police officer (e.g., the item of clothing 142) and the police vehicle 100 satisfies (e.g., is less than) an approach distance threshold, the police assistance unit 114 instructs the body control unit 116 to unlock one or more of the doors of the police vehicle 100. At block 308, the police assistance unit 114 instructs the body control unit 116 to roll up the windows of the police vehicle 100.

At block 310, the police assistance unit 114 determines whether (a) the police officer (e.g., the item of clothing 142) is outside the police vehicle 100 and (b) the transmission of the police vehicle 100 is not in a park setting. If the police officer (e.g., the item of clothing 142) is outside the police vehicle 100 and the transmission of the police vehicle 100 is not in the park setting, the method continues at block 312. Otherwise, if the police officer (e.g., the item of clothing 142) is inside the police vehicle 100 or the transmission of the police vehicle 100 is in the park setting, the method continues at block 316. At block 312, the police assistance unit 114 instructs the brake control unit 120 to apply the brakes of the police vehicle 100. At block 214, the police assistance unit 114 instructs the transmission control unit 118 to, after the police vehicle 100 has stopped, shift the transmission of the police vehicle 100 into the park setting.

At block 316, the police assistance unit 114 determines, via the light dome 108 and/or the range detection sensors 128, whether an object (e.g., a person, a vehicle, etc.) is approaching with a detection radius of the police vehicle 100. If an object is approaching the police vehicle 100, the method continues at block 318. Otherwise, if an object is not approaching the police vehicle 100, the method continues at block 324. At block 318, the police assistance unit 114 determines whether the police officer (e.g., the item of clothing 142) is inside the police vehicle 100. If the police officer (e.g., the item of clothing 142) is inside the police vehicle, the method continues at block 320. Otherwise, if the police officer (e.g., the item of clothing 142) is outside the police vehicle 100, the method continues at block 322. At block 320, the police assistance unit 114 sounds a notification (e.g., an alarm, a buzzer, a horn, etc.) to alert the police officer. At block 322, the police assistance unit 114 instructs the notification system 144 of the item of clothing 142, via one of the beacons 110 and 112, to sound a notification to alert the police officer.

At block 324, the police assistance unit 114 monitors the position of door (e.g., via the body control unit 116). If the police assistance unit 114 detects one of the doors opening, the method continues at block 326. Otherwise, if the police assistance unit 114 does not detect one of the doors opening, the method continues at block 332. At block 326, the police assistance unit 114 determines the location of the police officer (e.g., the item of clothing 142). If the distance between the police officer (e.g., the item of clothing 142) and the police vehicle 100 satisfies (e.g., is greater than) than a distance threshold, the method continues to block 328. Otherwise, if the distance between the police officer (e.g., the item of clothing 142) and the police vehicle 100 does not satisfy the distance threshold, the method continues to block 330. At block 328, the police assistance unit 114 triggers an alarm (e.g., instructs the body control unit 116 to activate the horn of the police vehicle 100). At block 330, the police assistance unit 114 instructs the notification system 144 of the item of clothing 142, via one of the beacons 110 and 112, to sound a notification to alert the police officer.

At block 332, the police assistance unit 114 monitors the temperature (e.g., via the cabin temperature sensor 124) of the cabin of the police vehicle 100. If the temperature of the cabin of the police vehicle 100 satisfies (e.g., is greater than) a cabin temperature threshold, the method continues at block 334. Otherwise, if the temperature of the cabin of the police vehicle 100 does not satisfy the cabin temperature threshold, the method continues at block 338. At block 334, the police assistance unit 114 determines whether there is a person and/or an animal in the police vehicle 100. If there is a person and/or an animal in the police vehicle 100, the method continues at block 336. Otherwise, if there is not a person and/or an animal in the police vehicle 100, the method continues at block 338. At block 336, the police assistance unit 114 instructs the notification system 144 of the item of clothing 142, via one of the beacons 110 and 112, to sound a notification to alert the police officer.

At block 338, the police assistance unit 114 monitors the temperature (e.g., via the engine temperature sensor 126) of the engine of the police vehicle 100. If the temperature of the engine of the police vehicle 100 satisfies (e.g., is greater than) an engine temperature threshold, the method continues at block 340. Otherwise, if the temperature of the engine of the police vehicle 100 does not satisfy the engine temperature threshold, the method continues at block 342. At block 340, the police assistance unit 114 instructs the notification system 144 of the item of clothing 142, via one of the beacons 110 and 112, to sound a notification to alert the police officer.

At block 342, the police assistance unit 114 monitors whether the police officer (e.g., the item of clothing 142) is inside or outside the police vehicle 100. If the police officer (e.g., the item of clothing 142) is outside the police vehicle 100, the method continues to block 344. Otherwise, if the police officer (e.g., the item of clothing 142) is inside the police vehicle 100, the method returns to block 302. At block 344, the police assistance unit 114 monitors the front portion of the interior of the cabin of the police vehicle 100. If the police assistance unit 114 detects movement in the front portion of the interior of the cabin, the method continues to block 346. Otherwise, if the police assistance unit 114 does not detect movement in the front portion of the interior of the cabin, the method returns to block 302. At block 346, the police assistance unit 114 instructs the notification system 144 of the item of clothing 142, via one of the beacons 110 and 112, to sound a notification to alert the police officer. The method then returns to block 302.

The flowchart of FIG. 3 is a method that may be implemented by machine readable instructions that comprise one or more programs that, when executed by a processor (such as the processor 204 of FIG. 2), cause the police vehicle 100 to implement the police assistance unit 114 of FIGS. 1A, 1B, and 2. Further, although the example program(s) is/are described with reference to the flowcharts illustrated in FIG. 3, many other methods of implementing the example police assistance unit 114 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A police vehicle comprising:
   first beacons positioned on a chassis of the police vehicle;
   second beacons positioned on a lightbar of the police vehicle;
   a police assistance unit, including a processor, to:
     track a distance of wearable nodes associated with a police officer and whether the wearable nodes are inside or outside the vehicle;
     detect movement in a front seat of the police vehicle;
     in response to the distance satisfying a first threshold, lock doors and roll up windows of the police vehicle; and,
     in response to detecting movement in the front seat of the police vehicle and determining that the wearable nodes are outside the police vehicle, send an alert to the wearable nodes.

2. The police vehicle of claim 1, wherein to track the distance of the wearable nodes associated with the police officer, the police assistance unit is to obtain signal strength values between the wearable nodes and at least one of the first beacons or the second beacons.

3. The police vehicle of claim 1, including in response to the distance satisfying a second threshold, unlock one of the doors, the second threshold being closer to the police vehicle than the first threshold.

4. The police vehicle of claim 1, wherein the police assistance unit is to:
   track whether the wearable nodes associated with the police officer are inside or outside the police vehicle; and
   in response to the wearable nodes being outside the police vehicle and a transmission of the police vehicle not being in a park setting:
     apply brakes of the police vehicle; and
     shift the transmission of the police vehicle into park.

5. The police vehicle of claim 1, wherein the police assistance unit is to:
monitor for activity within a detection radius around the police vehicle;
in response to detecting an object entering the detection radius:
when the wearable nodes are outside the vehicle, send an alert to the wearable nodes; and
when the wearable nodes are outside the vehicle, activate an alarm of the police vehicle.

6. The police vehicle of claim 1, wherein the police assistance unit is to:
monitor a state of the doors of the police vehicle;
in response to detecting one of the doors opening:
when the distance satisfies the first threshold, activate an alarm of the police vehicle; and
when the distance does not satisfy the first threshold, send an alert to the wearable nodes.

7. The police vehicle of claim 1, wherein the police assistance unit is to:
monitor a temperature of a cabin of the police vehicle;
detect movement in the cabin of the police vehicle; and
in response to the temperature satisfying a cabin temperature threshold and detecting movement in the cabin of the vehicle, send an alert to the wearable nodes.

8. The police vehicle of claim 1, wherein the police assistance unit is to:
monitor a temperature of an engine of the police vehicle;
in response to the temperature satisfying a engine temperature threshold, send an alert to the wearable nodes.

9. A method comprising:
receiving signal strength values from wearable nodes associated with a police officer from at least one of first beacons positioned on a chassis of a police vehicle or second beacons positioned on a lightbar of the police vehicle;
tracking, with a processor, a distance of the wearable nodes and whether the wearable nodes are inside or outside the vehicle;
detecting movement in a front seat of the vehicle;
in response to the distance satisfying a first threshold, locking doors and rolling up windows of the vehicle; and,
in response to detecting movement in the front seat and determining that the wearable nodes are outside the vehicle, sending an alert to the wearable nodes.

10. The method of claim 9, including in response to the distance satisfying a second threshold, unlocking one of the doors, the second threshold being closer to the police vehicle than the first threshold.

11. The method of claim 9, including:
tracking whether the wearable nodes associated with the police officer are inside or outside the police vehicle; and
in response to the wearable nodes being outside the police vehicle and a transmission of the police vehicle not being in a park setting:
applying brakes of the police vehicle; and
shifting the transmission of the police vehicle into park.

12. The method of claim 9, including:
monitoring for activity within a detection radius around the police vehicle;
in response to detecting an object entering the detection radius:
when the wearable nodes are outside the vehicle, sending an alert to the wearable nodes; and
when the wearable nodes are outside the vehicle, activating an alarm of the police vehicle.

13. The method of claim 9, including:
monitoring a state of the doors of the police vehicle;
in response to detecting one of the doors opening:
when the distance satisfies the first threshold, activating an alarm of the police vehicle; and
when the distance does not satisfy the first threshold, sending an alert to the wearable nodes.

14. The method of claim 9, including:
monitoring a temperature of a cabin of the police vehicle;
detecting movement in the cabin of the police vehicle; and
in response to the temperature satisfying a cabin temperature threshold and detecting movement in the cabin of the vehicle, sending an alert to the wearable nodes.

15. The method of claim 9, including:
monitoring a temperature of an engine of the police vehicle;
in response to the temperature satisfying a engine temperature threshold, sending an alert to the wearable nodes.

* * * * *